(12) United States Patent
Sobolevskiy et al.

(10) Patent No.: US 7,695,703 B2
(45) Date of Patent: Apr. 13, 2010

(54) HIGH TEMPERATURE CATALYST AND PROCESS FOR SELECTIVE CATALYTIC REDUCTION OF $NO_x$ IN EXHAUST GASES OF FOSSIL FUEL COMBUSTION

(75) Inventors: Anatoly Sobolevskiy, Orlando, FL (US); Joseph A. Rossin, Columbus, OH (US); Michael J. Knapke, Hilliard, OH (US)

(73) Assignee: Siemens Energy, Inc., Orlando, FL (US)

( * ) Notice: Subject to any disclaimer, the term of this patent is extended or adjusted under 35 U.S.C. 154(b) by 124 days.

(21) Appl. No.: 12/024,416

(22) Filed: Feb. 1, 2008

(65) Prior Publication Data

US 2009/0196813 A1 Aug. 6, 2009

(51) Int. Cl.
*B01D 53/56* (2006.01)
*B01J 29/072* (2006.01)
*B01J 37/00* (2006.01)
*B01J 37/10* (2006.01)

(52) U.S. Cl. .................. 423/239.2; 502/60; 502/64; 502/66; 502/85

(58) Field of Classification Search .............. 423/239.2; 502/60, 64, 66, 85
See application file for complete search history.

(56) References Cited

U.S. PATENT DOCUMENTS

| | | | |
|---|---|---|---|
| 3,493,519 A | 2/1970 | Kerr et al. | |
| 4,789,656 A | 12/1988 | Chen et al. | |
| 5,589,147 A | 12/1996 | Farnos et al. | |
| 5,710,085 A | 1/1998 | Absil et al. | |
| 6,689,709 B1 | 2/2004 | Tran et al. | |
| 6,914,026 B2 | 7/2005 | Tran et al. | |
| 7,182,927 B2* | 2/2007 | Tran et al. | 423/237 |
| 2003/0050182 A1 | 3/2003 | Tran et al. | |
| 2006/0088469 A1* | 4/2006 | Perez-Ramirez | 423/701 |
| 2007/0134146 A1* | 6/2007 | Bull et al. | 423/239.2 |
| 2008/0044331 A1* | 2/2008 | Schwefer et al. | 423/213.5 |

FOREIGN PATENT DOCUMENTS

| | | |
|---|---|---|
| EP | 0384186 A1 | 8/1990 |
| EP | 1810751 A1 | 7/2007 |
| WO | 9601689 A1 | 1/1996 |

OTHER PUBLICATIONS

Chi-Cheng Liu, Hsisheng Teng; "Cu/MCM-41 for selective catalytic NO reduction with NH3—comparison of different Cu-loading methods"; Applied Catalysis B: Environmental 58; Jan. 4, 2005; pp. 69-77; Elsevier B.V.

(Continued)

*Primary Examiner*—Timothy C Vanoy (57) ABSTRACT

A process for producing a stable high-temperature catalyst for reduction of nitrogen oxides in combustion exhaust gases at operating temperatures from 300° C. to over 700° C. without the need for exhaust dilution. A zeolite material is steam-treated at a temperature and duration sufficient to partially de-aluminize the zeolite to approximately a steady state, but not sufficient to fully collapse its chemical structure. Iron is added to the zeolite material. The zeolite material is calcined at a temperature, humidity, and duration sufficient to stabilize the zeolite material. Examples and specifications for ranges, order, and durations of steaming, calcining, and other steps are provided.

19 Claims, 1 Drawing Sheet

OTHER PUBLICATIONS

Gongshin Qi, Ralph T. Yang; "Ultra-active Fe/ZSM-5 catalyst for selective catalytic reduction of nitric oxide with ammonia"; Applied Catalysis B: Environmental 60; Mar. 16, 2005; pp. 13-22; Elsevier B.V.

Ramon Moreno-Tost, Jose Santamaria-Gonzalez, Enrique Rodriguez-Castellon, Antonio Jimenez-Lopez, Miguel A. Autie, Edel Gonzalez, Marisol Carreras Glacial, Carlos De Las Pozas; "Selective catalytic reduction of nitric oxide by ammonia over Cu-exchanged Cuban natural zeolites"; Applied Catalysis B: Environmental 50; Apr. 2, 2004; pp. 279-288; Elsevier B.V.

Gerard Delahay, Stephane Kieger, Nathalie Tanchoux, Philippe Trens, Bernard Coq; "Kinetics of the selective catalytic reduction of NO by NH3 on a Cu-faujasite catalyst"; Applied Catalysts B: Enviromental 52; Jun. 2, 2004; pp. 251-257; Elsevier B.V.

Scott A. Stevenson, Jim C. Vartuli, and Sanjay B. Sharma; "The Effects of Steaming and Sodium Exchange on the Selective Catalytic Reduction of NO and NO2 by NH3 over HZSM-5"; Journal of Catalysis 208; 2002; pp. 106-113; Elsevier Science, USA.

R.Q. Long and R.T. Yang; "Selective Catalytic Reduction of NO with Ammonia over Fe3+-Exchanged Mordenite (Fe-MOR): Catalytic Performance, Characterization, and Mechanistic Study"; Journal of Catalysis 207; 2002; pp. 274-285; Elsevier Science, USA.

Kevin J. Rogers; "SCR Inlet Maldistributions—Their Effects & Strategies for Their Control"; Proceedings of the 2002 Conference on Selective Catalytic Reduction and Selective Non-Catalytic Reduction for NOx Control; Presented in the US; May 15-16, 2002; Published by the National Energy Technology Laboratory.

V.I. Parvulescu, P. Grange, B. Delmon; "Catalytic removal of NO"; Catalysis Today 46; 1998; pp. 233-316; Elsevier Science B.V.

* cited by examiner

HIGH TEMPERATURE CATALYST AND PROCESS FOR SELECTIVE CATALYTIC REDUCTION OF $NO_x$ IN EXHAUST GASES OF FOSSIL FUEL COMBUSTION

FIELD OF THE INVENTION

The invention relates to catalysts and processes for the reduction of $NO_x$ using a reducing agent such as $NH_3$ in combustion exhaust at temperatures from 300° C. to over 600° C.

BACKGROUND OF THE INVENTION

Selective catalytic reduction (SCR) is a technology for reduction of nitrogen oxide ($NO_x$) emissions from combined and simple cycle power plants and coal-fired boilers. The process involves injecting $NH_3$ into the exhaust gas upstream of a catalytic reactor. Within the catalyst bed, $NO_x$ reacts with adsorbed $NH_3$ in the presence of $O_2$ to form primarily $N_2$ and water. Traditional catalysts employed by the process consist of $V_2O_5$ supported on high-surface-area $TiO_2$. The process achieves up to 90-95% $NO_x$ reduction efficiency at low to moderate reaction temperatures (300-420° C.). Traditional SCR processes are operated with stoichiometric $NH_3/NO_x$ ratios consistent with an 80-90% NOx reduction. Operation with higher $NH_3/NO_x$ ratios enhances the $NO_x$ reduction efficiency at the expense of ammonia slip, which often needs to be below than 2-5 ppm. $NH_3$ slip contributes to emissions of nitrogen compound into the atmosphere and leads to the formation of corrosive ammonium sulfates and bisulfates downstream of the SCR. These compounds also may plug heat exchange surfaces in the heat recovery steam generator (HRSG).

For combined-cycle power plants, the SCR reactor is integrated into the HRSG. In this manner, the catalyst temperature under normal operation conditions of 50-100% load is between 300 and 370° C. However, in simple cycle power plants the temperature of the exhaust leaving a high efficiency gas turbine can exceed 600° C. Absent any heat exchange surfaces in the post turbine enclosure, the reactions between ammonia and $NO_x$ encounter these high temperatures. This requires an SCR catalyst durable to high temperatures and thermal shock, since the temperature in the gas turbine exhaust reaches its maximum in a short period of time, such as 10 minutes.

High temperature of the exhaust gases requires a reduction in the distance between NH3 injection plane and a face of SCR in order to minimize substantial decomposition of ammonia at temperatures above 500° C. A short distance between ammonia injection grid and the face of SCR dictates the installation of special distribution/mixing devices in order to mitigate maldistribution problems resulting from shrinking zone for ammonia and NOx upstream mixing.

Locating a $V_2O_5/TiO_2$ SCR catalyst downstream of a gas turbine in temperatures above 550° C. is not feasible, as the temperatures of the flue gas will rapidly deactivate the $V_2O_5/TiO_2$ catalyst, due to a transformation of the $TiO_2$ from the high surface area anatase phase to the low surface area rutile phase.

Acidified, metal-impregnated, zeolite-based SCR catalysts have been investigated as an alternative to the $V_2O_5/TiO_2$ SCR catalyst (Farnos et al. 1996; Parvulescu et al. 1998; Stevenson and Vartuli, 2002; Qi and Yang, 2004). Zeolite based catalysts are being investigated because they offer advantages over $V_2O_5/TiO_2$ SCR catalysts, namely wider operating temperature range, greater thermal stability, and reduced disposal issues associated with the spent catalyst. Although many types of zeolites have been found to facilitate the reactions between NH3 and NOx (Long and Yang, 2002; Delahay et al, 2004; Moreno-Tost et al., 2004; Liu and Teng, 2005), zeolites ZSM-5 and zeolite beta appears to be the most promising. Unlike $V_2O_5/TiO2$ SCR catalysts, the zeolite-based catalyst is unable to effectively oxidize NO. Consequently, a metal function, such as iron, cobalt, etc. is added to the acidified zeolite in order to oxidize NO to $NO_2$, which is decomposed according to the following reaction scheme (Long and Yang, 2002):

(1)

(2)

(3)

(4)

The rate-limiting step in the reaction sequence is the oxidation of NO to $NO_2$. From equations 1 through 4, ammonia rapidly adsorbs onto the Brønsted acidic sites on the surface of the zeolite to yield adsorbed ammonium ions. NO is oxidized over the metal function (iron oxide) to yield $NO_2$. $NO_2$ interacts with the adsorbed ammonium ions to form an adsorbed ammonium nitrite complex, which decomposes upon reaction with NO to yield $N_2$ and $H_2O$, completing the catalytic cycle. The overall reaction is identical to that of conventional $V_2O_5/TiO_2$ SCR catalysts.

(5)

Tran et al. (U.S. Pat. Nos. 6,689,709 and 6,914,026) report the use of iron exchanged zeolite beta and iron/cerium exchanged zeolite beta in the selective catalytic reduction of NOx using NH3. The catalyst was prepared by ion exchange of zeolite beta using cerium, followed by ion exchange with iron. The catalyst achieved enhanced stability over a material prepared without the addition of cerium. Tran et al. also report the improved stability achieved upon steam treatment at 650° C., 10% $H_2O$ for 2 hours. In all cases, catalytic materials lose activity over time.

Absil et al. (U.S. Pat. No. 5,710,085) report improved durability of zeolite beta upon treatment using phosphorous. The resulting material displayed enhanced stability and activity during catalytic cracking studies. Exposure of zeolite to water vapor at an elevated temperature results in the removal of framework aluminum. However hydrothermal treatments under some conditions are known to enhance both the structural stability and acidity of zeolites (Kerr et al., 1970, Breck 1974, Chen and McCullen, 1988; Stevenson et al., 2002).

Despite the above enhancements, prior catalysts do not provide stability and adequate NOx removal efficiency at temperatures above about 550° C. Thus, they cannot efficiently reduce NOx emissions in a direct gas turbine exhaust, such as in simple cycle power plants, without dilution of the exhaust with cooler air. However, dilution of the exhaust significantly reduces the overall gas turbine efficiency, and is not a cost-effective option.

BRIEF DESCRIPTION OF THE DRAWINGS

The invention is explained in the following description in view of the drawings that show.

DETAILED DESCRIPTION OF THE INVENTION

Figure 1:
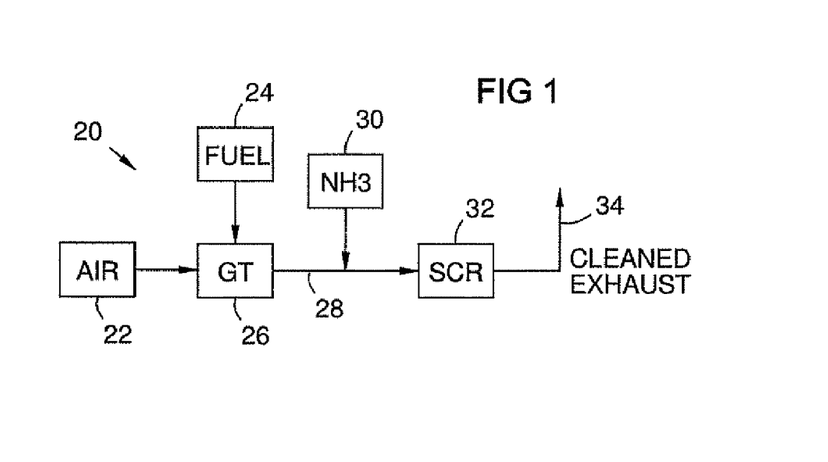
FIG. 1 is a schematic diagram of a gas turbine with exhaust cleaned by selective catalytic reduction. Dashed lines are used for some curves to distinguish them from other crossing curves.

FIG. 1 illustrates a gas turbine system 20 with an air input 22, a fuel input 24, a gas turbine 26, a combustion exhaust 28, a reducer (ammonia) input 30, a selective catalytic reduction bed 32, and a cleaned exhaust 34. Ammonia is injected through nozzles installed within an ammonia distribution grid that is located a short distance from the face of the SCR bed 32. The short distance between the ammonia injection grid and the face of the SCR is required to minimize the decomposition of ammonia at high temperatures of the exhaust above 550° C. As a result, a short NH3/NOx mixing zone can lead to a severe maldistribution effect and can significantly reduce the performance of the SCR downstream. To overcome this problem special distribution/straightening and mixing devices need to be installed upstream of the SCR bed in order to provide a good mixing between NH3 and NOx upstream of the SCR. Such mixing devices are well known from the previous art (e.g. K. J. Rogers, Proceedings of the 2002 Conference on Selective Catalytic Reduction and Selective Non-Catalytic Reduction for NOx Control, US DOE).

Figure 2:
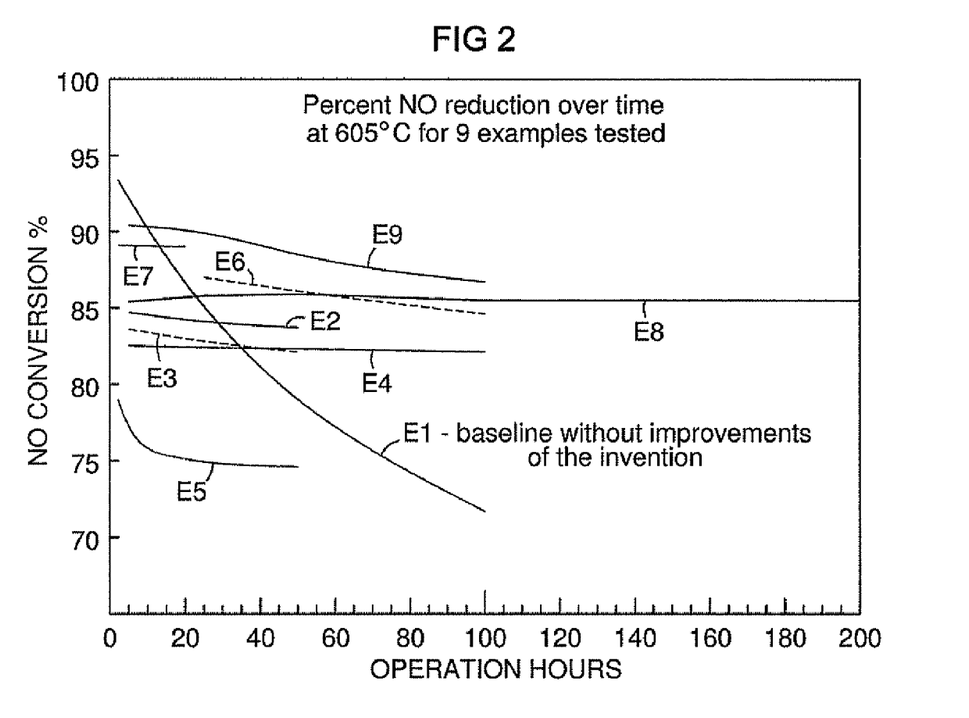
FIG. 2 compares NO reduction efficiency over time for 8 tested examples of the invention and a baseline example without improvements of the invention.

The inventors devised a production process to improve catalytic stability at high temperatures, and achieved dramatic results as shown in FIG. 2. A baseline catalyst was produced with known methods as described under example 1 below. $NO_x$ removal efficiency at 605° C. for the baseline sample is represented by curve E1. Eight other catalysts were prepared according to examples 2-9 below. Their $NO_x$ removal efficiencies are represented by curves E2-E9 respectively. The baseline curve E1 dives constantly downward, never stabilizing. In contrast, the inventive examples show full or greatly improved stability over time. Ammonia slip was reduced in the inventive samples, as detailed in tables below. Only catalysts prepared with the following three steps in combination, using certain characteristic ranges in the preparation process, showed the best improvement.

A basic aspect of the invention is preparing a metal-containing zeolite catalytic material by: (1) steam treatment of the zeolite, (2) addition of iron into the pore volume of the steam-treated zeolite, and (3) high-temperature calcinations. The order and number of the above steps may vary, as exemplified below. In all of the examples high temperature calcination at 750 C-900 C for 1-5 hours was performed at a time after a steam treatment at 500 C-600 C for 5-15 hours. The inventors expected that various alternative base metals or platinum group metals could be used for step 2, and that at least some of them would provide similar efficiencies. However, it was found that at least iron is essential for the best stability at high temperatures. Other metals may be added in addition to iron as later described to provide enhancements.

According to an aspect of the invention, a zeolite, for example zeolite Y, zeolite beta and/or zeolite ZSM-5, is first treated with steam (e.g. water vapor) at an elevated temperature. Exposure of zeolites to water vapor at temperatures greater than about 400° C. is known to destabilize zeolites (Breck, 1974), so this step of the invention may seem counterintuitive. Exposure to water vapor results in dealumination (removal of framework aluminum) of the zeolite. Dealumination of a zeolite occurs via the following reaction (Breck, 1974):

(6)

The above treatment results in the formation of aluminum hydroxide and a "hydroxyl nest," a defect in the lattice of the zeolite resulting in the termination of framework silicon atoms with hydroxyl groups. If the treatment conditions are not excessive, the extent of dealumination upon exposure to steam will reach a steady state, with the residual amount of framework alumina dependent upon the $SiO_2/Al_2O_3$ ratio of the starting zeolite, the temperature of the exposure, the concentration of water vapor in the air, and the duration of the exposure. Should the conditions be excessive, the entire zeolite structure will collapse. Therefore, optimum ranges of temperature, water vapor, and duration are required to provide the results needed herein.

The present steam treatment of zeolite (e.g. zeolite beta) may be performed at a temperature between about 400° C. and about 800° C., preferably between 500° C. and 600° C., employing between about 5% and 100% water vapor, preferably between about 10% and 25%, for a duration between 30 minutes and 48 hours, preferably between 2 hours and 24 hours, and more preferably between 5 hours and 15 hours.

Following steam treatment, the zeolite is preferably loaded with iron necessary to catalyze the oxidation of NO to $NO_2$ as described in equation 2. Promoters, such as tungsten, lanthanum, cerium, barium, vanadium, phosphorous and cesium, may also be added at this time. Techniques used in loading metals into zeolite include, but are not limited to, ion exchange, impregnation, and metal vapor deposition. These techniques are known in the art.

Alternatively, the catalyst may be prepared by performing the metal loading step first followed by steam treatment. Alternatively, a portion of the metals and/or certain metals may be incorporated prior to steam treatment, with the remaining metals incorporated following steam treatment.

Following metal loading, the zeolite is stabilized by calcining in dry air (less than 2% $H_2O$) at an elevated temperature. High temperature calcination is a key step in the preparation of the catalyst disclosed herein. The calcination is performed at about 500° C.-1100° C., and preferably between about 750° C. and 900° C. The duration of the calcination is between about 30 minutes and about 72 hours, and preferably between about 1 hours and 5 hours.

This high temperature calcination results in dehydroxylation of the zeolite, i.e., removal of water from the hydroxyl nest. While not wishing to be bound by any theory, it is believed that the high temperature thermal treatment stabilizes the zeolite by closing a "defect" site, thereby reducing the size of the unit cell.

(7)

Further, it is believed that by incorporating metals within the zeolite prior to high temperature calcination, the catalytic metals, or a portion thereof, become incorporated into the defect site, resulting in a highly stabilized metal phase.

At one point during the preparation of the material, a catalytic metal necessary to oxidize NO to $NO_2$ (equation 2), especially iron, must be incorporated into the catalyst. Metals may be incorporated at several steps during the manufacture of the catalyst. For example, metals providing either oxidation or stabilizing functions may be incorporated prior to steam treatment or following steam treatment, prior to high temperature calcinations. Although less preferred, metals may be incorporated into the zeolite following high temperature calcinations or added to the binder employed in the washcoating of the zeolite. By this last technique, a metal, or a portion thereof, may become incorporated into the lattice of the binder. Examples of binders include aluminum, zirconium, and silicon-based materials as known in the art. Also less preferred, metal may be added to the catalyst following preparation into formed material, such as for example beads, rings, spheres, extrudates, granules, a monolith, or a washcoated monolith.

Zeolite beta may be synthesized over a range of silica to alumina ($SiO_2/Al_2O_3$) ratios between about 10 to greater than 100, and preferably between about 15 and about 25. The type and concentration of oxidation metal employed in the catalyst may vary. Examples of oxidation metals for equation 2 include base metals such as iron, cobalt, nickel, chromium and copper, and platinum group metals, examples of which include platinum and palladium. Mixtures thereof may also be employed. In selecting metals necessary to facilitate the oxidation of NO to $NO_2$ as per equation 2, the metal type and metal loading will be dependent upon the operating temperature of the catalyst. As the operating temperature increases, the decomposition of NH3 over the oxidation metal will become significant, especially as the temperature of the process exceeds about 450° C., and more significant as the temperature of the process exceeds about 550° C.

As a result, the types and concentrations of oxidation metals may vary greatly. Thus, the loading of base metals may be as low as 0.01%, or as high as about 10%. The loading of platinum group metals, known to be more reactive oxidation catalysts, may be as low as 0.001% to as great as 1%. The addition of platinum group metals to the catalyst formulation is also expected to facilitate the decomposition of CO and non-methane hydrocarbons.

Promoters and stabilizing agents may be added to the catalyst to stabilize the structural integrity of the zeolite, stabilize the Brønsted acidity of the zeolite, stabilize the oxidation metal, enhance the overall acidity of the zeolite, and/or reduce coke formation within the pores of the zeolite during start-up. Such agents may include tungsten, vanadium, lanthanum, cerium, phosphorous, barium, zirconium, and cesium, or mixtures thereof. The concentration and type of metal may vary. For example concentrations may be as low as 0.01% or as high as 10%, preferably between 0.3% and 3%. Promoters may also be added to the binder employed in the preparation of the catalyst in order to enhance the hydrothermal stability of the binder material.

The catalyst described in this invention may be employed in a variety of geometric forms sufficient to bring about contact between the catalyst and the process stream. These forms include beads, rings, spheres, granules, etc. Alternatively, the catalyst may be either extruded as a monolith, or may be washcoated onto surfaces of geometric forms, such as for example those listed above. Preferably, the catalyst may be washcoated onto the external surface of a ceramic monolith. A monolith may be in a honeycomb form for example, with of a series of straight, non-interconnecting channels. Onto the surface of the monolith, a thin coating of catalytic material is deposited, termed "washcoat" in the art. Monoliths offer several advantages, including low thermal mass, excellent utilization of catalytic material, low pressure drop and predictable flow characteristics.

The SCR process of the invention that uses the catalyst described herein involves contacting the combustion exhaust stream with the catalyst in a manner necessary to facilitate a reaction between NOx (mixtures of NO and $NO_2$) and a reducing agent such as preferably $NH_3$. The reaction temperature may vary from about 300° C. to over 700° C., preferably 500° C.-650° C., and more preferably 550° C.-620° C. The gas hourly space velocity (GHSV) may vary from about 2,000 volumes per hour to over 150,000 per hour, preferably 6,000-50,000 per hour, and even more preferably 15,000-30,000 volumes per hour. The concentration of NOx in the process stream may range from less than 10 ppm to greater than several hundred ppm.

EXAMPLES

All zeolite beta reported in the following examples was obtained in the ammonium form, and was calcined prior to use in order to remove the organic templating agent.

Example 1

Baseline Zeolite Beta with Fe, No Steam, Minor Calcination

Baseline iron-containing zeolite beta was prepared by adding 15 g of calcined zeolite beta to a 100 ml beaker. To the beaker was added 60 ml of distilled (DI) water, 15 g of zirconium acetate solution (20% $ZrO_2$ by weight) and 0.109 g iron (III) nitrate nonahydrate (13.8 wt % iron). The resulting solution was mixed to form a slurry containing 0.001 parts iron per part zeolite beta. The slurry was used to washcoat a piece of monolith having a cell density of 230 cells/$in^2$ and a volume of 21.4 $cm^3$. Following washcoating, the monolith was dried, then calcined at 525° C. for 1 hour. The baseline catalyst described above was evaluated for its ability to decompose NO using NH3. The baseline catalyst was evaluated at 605° C. at a space velocity of 20,000 $hr^{-1}$ employing a feed stream consisting of 10% $O_2$, 6.8% $H_2O$, 50 ppm NO, 60 ppm NH3, balance $N_2$. The table below reports the conversion of NO and the effluent concentration of NH3 as a function of time.

| Time-on-stream | NO Conversion | Effluent [NH3] |
|---|---|---|
| 2 hrs | 93.4% | 2.1 ppm |
| 10 hrs | 90.2% | 5.2 ppm |
| 50 hrs | 79.0% | 13.1 ppm |
| 100 hrs | 71.7% | 17.1 ppm |

Example 2

Zeolite Beta with 0.6% Fe, Steam, Calcination, Fe Addition 18 g of calcined zeolite beta was exposed to 15% $H_2O$/Air at 525° C. for 5 hours then calcined at 825° C. for 2 hours in dry air. The resulting zeolite powder was used to prepare a monolithic catalyst. 17.6 g of the above zeolite was added to a 100 ml beaker. To the beaker was added 50 ml DI water, and 0.764 g iron (III) nitrate nonahydrate (13.8 wt % iron). Following 1 hour, 17.6 g of zirconium acetate solution was added to the slurry and then mixed. (20% $ZrO_2$ by weight). The slurry was used to washcoat a piece of monolith having a cell density of 230 cells/in$^2$ and a volume of 26.2 cm$^3$. Following washcoating, the monolith was dried, then calcined at 525° C. for 1 hour. The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time.

| Time-on-stream | NO Conversion | Effluent [NH3] |
| --- | --- | --- |
| 5 hrs | 84.7% | 5.4 ppm |
| 25 hrs | 84.1% | 7.5 ppm |
| 50 hrs | 83.7% | 8.6 ppm |

Example 3

Zeolite Beta with 0.6% Fe Prepared by Fe Addition, Steam, Calcination 25 g of calcined zeolite beta was added to a 200 ml beaker. To the beaker was added 50 ml of DI water and the slurry was stirred. To the resulting slurry was added 1.0853 g iron (III) nitrate nonahydrate (13.8 wt % iron). The slurry was then heated to 90° C. Following 3 hours, the slurry was removed and filtered. Resulting material was washed with DI water and filtered again. Dried material was exposed to 15% $H_2O$/Air at 525° C. for 5 hours, and then calcined at 825° C. for 2 hours in dry air. Following steam treatment, the material was brown in color. Following high temperature calcinations, the material turned white.

The resulting material powder was used to prepare a monolithic catalyst. 20.0 g of the above zeolite was added to a 100 ml beaker. To the beaker was added 65 ml DI water, and 20 g zirconium acetate solution (20% $ZrO_2$ by weight). The resulting solution was mixed to form a slurry. The slurry was used to washcoat a piece of monolith having a cell density of 230 cells/in$^2$ and a volume of 26.2 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time. Note: Compared to example 1, the zeolite is far more stable. Ammonia slip is less than that of Example 2, indicating a more reactive iron phase.

| Time-on-stream | NO Conversion | Effluent [NH3] |
| --- | --- | --- |
| 5 hrs | 83.6% | 3.2 ppm |
| 25 hrs | 82.8% | 4.4 ppm |
| 50 hrs | 82.1% | 4.7 ppm |

Example 4

Zeolite Beta with 0.6% Fe Prepared by Steam, Fe Addition, Calcination 20 g of calcined zeolite beta was steam treated by exposure to 15% $H_2O$/Air at 525° C. for 5 hours. The resulting zeolite powder was then added to a 200 ml beaker. To the beaker was added 100 ml of DI water and the slurry was stirred. To the resulting slurry was added 0.8683 g iron (III) nitrate nonahydrate (13.8 wt % iron). The slurry was then heated to 90° C. Following 3 hours, the slurry was removed and filtered. Resulting material was washed with DI water and filtered again. The resulting dried iron-containing zeolite was then calcined at 825° C. for 2 hours in dry air. Following steam treatment, the material was brown in color. Following high temperature calcinations, the material turned white.

The resulting iron-containing zeolite powder was used to prepare a monolithic catalyst. 15.0 g of the above zeolite was added to a 100 ml beaker. To the beaker was added 50 ml DI water, and 15 g zirconium acetate solution. (20% $ZrO_2$ by weight). The resulting solution was mixed to form a slurry. The slurry was used to washcoat a piece of monolith having a cell density of 230 cells/in$^2$ and a volume of 26.2 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time.

| Time-on-stream | NO Conversion | Effluent [NH3] |
| --- | --- | --- |
| 5 hrs | 82.5% | 3.2 ppm |
| 25 hrs | 82.4% | 4.6 ppm |
| 50 hrs | 82.3% | 5.6 ppm |
| 100 hrs | 82.1% | 5.8 ppm |

This catalyst was evaluated for its ability to decompose NOx using NH3 employing 60 ppm as well as 70 ppm NH3 in the process stream as described previously.

| [NH3] | NO Conversion | Effluent [NH3] |
| --- | --- | --- |
| 60 ppm | 76.8% | 3.2 ppm |
| 70 ppm | 82.1% | 5.8 ppm |

The catalyst was evaluated for its ability to decompose NOx employing a 60 ppm inlet NH3 at alternative reaction temperatures employing the process stream described above.

| Temperature | NO Conversion | Effluent [NH3] |
| --- | --- | --- |
| 548° C. | 87.8% | 6.5 ppm |
| 575° C. | 83.5% | 4.8 ppm |
| 590° C. | 80.6% | 4.0 ppm |
| 605° C. | 76.8% | 3.2 ppm |

Example 5

Zeolite Beta with 0.6% Fe, 5% W 50 g of calcined zeolite beta was added to a 500 ml beaker. To the beaker was added 400 ml of DI water and the slurry was stirred. To the resulting slurry was added 2.6 g of ammonia metatungstate (94.0 wt % $WO_3$). The slurry was then heated to 90° C. Following 4 hours, the slurry was filtered. Resulting solids were washed with DI water, then dried. Dried tungsten-zeolite was then steam treated by exposure to 15% $H_2O$/air at 500° C. for 6 hours, then calcined at 825° C. for 2 hours in dry air.

The resulting tungsten-containing zeolite powder was used to prepare a monolithic catalyst. 15 g of the above zeolite was added to a 100 ml beaker. To the beaker was added 80 ml DI water, 0.661 g iron (III) nitrate nonahydrate (13.8 wt % iron), and 15 g zirconium acetate solution (20% $ZrO_2$ by weight). The resulting solution was mixed to form a slurry containing 0.006 parts iron per part zeolite beta. The slurry was used to washcoat a piece of monolith having a cell density of 230 cells/in$^2$ and a volume of 25.9 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 60 ppm NH3, balance $N_2$. The table below reports the conversion of NO and the effluent concentration of NH3 as a function of time.

| Time-on-stream | NO Conversion | Effluent [NH3] |
| --- | --- | --- |
| 2 hrs | 79.0% | 4.6 ppm |
| 10 hrs | 75.8% | 5.4 ppm |
| 50 hrs | 74.6% | 6.1 ppm |

The catalyst was evaluated for its ability to decompose NOx using NH3 at alternative reaction temperatures employing the process stream described above.

| Temperature | NO Conversion | Effluent [NH3] |
| --- | --- | --- |
| 550° C. | 84.7% | 7.7 ppm |
| 580° C. | 80.7% | 7.1 ppm |
| 605° C. | 74.6% | 6.1 ppm |

The catalyst was evaluated for its ability to decompose NOx using NH3 at a space velocity of 15,000 and a temperature of 605° C. employing 60 and 70 ppm NH3 in the process stream as described previously.

| [NH3] | NO Conversion | Effluent [NH3] |
| --- | --- | --- |
| 60 ppm | 77.6% | 3.9 ppm |
| 70 ppm | 86.8% | 6.6 ppm |

Example 6

Zeolite Beta with 0.6% Fe, 5% La 100 g of calcined zeolite beta was added to an 800 ml beaker. To the beaker was added 700 ml of DI water and the slurry was stirred. To the resulting slurry was added 15.5 g of lanthanum nitrate nonahydrate. The slurry was then heated to 95° C. Following 6 hours, the slurry was removed and filtered. Resulting solids were washed with DI water, then dried.

25 g of this lanthanum zeolite beta was added to a 200 ml beaker. To the beaker was added 150 ml of DI water and the slurry was stirred. To the resulting slurry was added 1.09 g of iron (III) nitrate nonahydrate (13.8 wt % iron). The slurry was then heated to 90° C. Following 2 hours, the slurry was removed and filtered. Resulting solids washed with DI water, then dried. Dried solids were then steam treated by exposure to 15% $H_2O$/Air at 500° C. for 14 hours, then calcined at 825° C. for 2 hours in dry air.

The resulting iron-lanthanum-containing zeolite powder was used to prepare a monolithic catalyst. 12.25 g of the above zeolite was added to a 100 ml beaker. To the beaker was added 60 ml DI water and 12.25 g zirconium acetate solution (20% $ZrO_2$ by weight). The resulting solution was mixed to form a slurry. The slurry was used to washcoat a piece of monolith having a cell density of 230 cells/in$^2$ and a volume of 25.9 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time.

| Time-on-stream | NO Conversion | Effluent [NH3] |
| --- | --- | --- |
| 25 hrs | 87.0% | 4.3 ppm |
| 50 hrs | 86.1% | 5.1 ppm |
| 100 hrs | 84.6% | 5.6 ppm |

Example 7

Zeolite Beta with 1.0% Fe, 5% La 25 g of lanthanum zeolite beta from Example 6 was added to a 200 ml beaker. To the beaker was added 150 ml of DI water and the slurry was stirred. To the resulting slurry was added 1.81 g of iron (III) nitrate nonahydrate (13.8 wt % iron). The slurry was then heated to 90° C. Following 3 hours, the slurry was removed and filtered. Resulting material was washed with DI water, then dried. Dried material was then steam treated by exposure to 15% $H_2O$/Air at 525° C. for 5 hours, then calcined at 825° C. for 2 hours in dry air.

The resulting iron-lanthanum-containing zeolite powder was used to prepare a monolithic catalyst. 15.0 g of the above zeolite was added to a 100 ml beaker. To the beaker was added 60 ml DI water and 15.0 g zirconium acetate solution (20% $ZrO_2$ by weight). The resulting solution was mixed to form a slurry. The slurry was used to washcoat a piece of monolith having a cell density of 230 cells/in$^2$ and a volume of 25.9 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 82 ppm NH3, balance $N_2$. The table below reports the conversion of NO and the effluent concentration of NH3 as a function of time.

| Time-on-stream | NO Conversion | Effluent [NH3] |
| --- | --- | --- |
| 2 hrs | 89.1% | 3.4 ppm |
| 20 hrs | 89.0% | 5.3 ppm |

The catalyst was evaluated for its ability to decompose NOx using NH3 employing 60, 70 and 82 ppm NH3 in the process stream as described previously.

| [NH3] | NO Conversion | Effluent [NH3] |
| --- | --- | --- |
| 60 ppm | 73.2% | 2.1 ppm |
| 70 ppm | 83.2% | 2.1 ppm |
| 82 ppm | 89.0% | 5.3 ppm |

Example 8

Zeolite Beta with 1.0% Fe, 2.5% W 26 g of calcined zeolite beta was exposed to 15% $H_2O$/Air at 525° C. for 5 hours. The resulting material was then added to a 200 ml beaker. To the beaker was added 100 ml of DI water and the slurry was stirred. To the resulting slurry was added 1.809 g iron (III) nitrate nonahydrate (13.8 wt % iron) and 1.066 g ammonia metatungstate (94.0 wt % $WO_3$). The slurry was then heated to 90° C. Following 3 hours, the slurry was removed and filtered. Resulting zeolite was washed with DI water and filtered again. The resulting dried iron-tungsten-containing zeolite was then calcined again at 825° C. for 2 hours in dry air. Following steam treatment, the material was brown in color. Following high temperature calcinations, the material turned white.

The resulting iron-tungsten-containing zeolite powder was used to prepare a monolithic catalyst. 23.0 g of the above zeolite was added to a 100 ml beaker. To the beaker was added 70 ml DI water, and 23 g zirconium acetate solution. (20% $ZrO_2$ by weight). The resulting solution was mixed to form a slurry. The slurry was used to washcoat a piece of monolith having a cell density of 230 cells/in$^2$ and a volume of 26.2 cm$^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 hr$^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time.

| Time-on-stream | NO Conversion | Effluent [NH3] |
| --- | --- | --- |
| 5 hrs | 85.4% | 7.4 ppm |
| 25 hrs | 85.8% | 8.5 ppm |
| 50 hrs | 85.9% | 9.0 ppm |
| 100 hrs | 85.5% | 9.1 ppm |
| 150 hrs | 85.5% | 9.1 ppm |
| 200 hrs | 85.5% | 9.1 ppm |

The catalyst was evaluated for its ability to decompose NOx using NH3 at alternative reaction temperatures employing the process stream described above.

| Temperature | NO Conversion | Effluent [NH3] |
| --- | --- | --- |
| 545° C. | 92.0% | 15.7 ppm |
| 570° C. | 90.1% | 12.8 ppm |
| 585° C. | 88.1% | 10.7 ppm |
| 605° C. | 85.5% | 9.1 ppm |

The catalyst was evaluated for its ability to decompose NOx employing a 60 ppm inlet NH3 at alternative reaction temperatures employing the process stream described above.

| Temperature | NO Conversion | Effluent [NH3] |
| --- | --- | --- |
| 545° C. | 88.8% | 8.8 ppm |
| 570° C. | 86.2% | 7.1 ppm |
| 585° C. | 83.5% | 6.1 ppm |
| 605° C. | 79.6% | 5.0 ppm |

The catalyst was then evaluated at a space velocity of 15,000 hr$^{-1}$ employing a process stream described above with a 70 ppm inlet NH3 inlet at a temperature of 605° C.

| GHSV | NO Conversion | Effluent [NH3] |
| --- | --- | --- |
| 15,000 | 88.4% | 5.5 ppm |

The catalyst was then evaluated at a space velocity of 15,000 hr$^{-1}$ employing a process stream described above with a 60 ppm inlet NH3 inlet at a temperature of 605° C.

| GHSV | NO Conversion | Effluent [NH3] |
| --- | --- | --- |
| 15,000 | 84.2% | 3.1 ppm |

Example 9

Zeolite Beta with 1% Fe, 1% P 25 g of calcined zeolite beta was steam treated by exposure to 15% $H_2O$/Air at 525° C. for 5 hours. The resulting zeolite powder was then added to a 200 ml beaker. To the beaker was added 100 ml of DI water and the slurry was stirred. To the resulting slurry was added 1.881 g iron (III) nitrate nonahydrate (13.8 wt % iron) and 1.066 g ammonium phosphate (23.4% phosphorous by weight). The slurry was then heated to 90° C. Following 3 hours, the slurry was removed and filtered. Resulting zeolite was washed with DI water and filtered again. The resulting dried iron-phosphorous-containing zeolite was then calcined again at 825° C. for 2 hours in dry air. Following steam treatment, the material was brown in color. Following high temperature calcinations, the material turned white.

The resulting iron-phosphorous-containing zeolite powder was used to prepare a monolithic catalyst. 22.44 g of the above zeolite was added to a 100 ml beaker. To the beaker was added 70 ml DI water, and 22.44 g zirconium acetate solution. (20% $ZrO_2$ by weight). The resulting solution was mixed to form a slurry. The slurry was used to washcoat a piece of monolith having a cell density of 230 cells/$in^2$ and a volume of 25.9 $cm^3$. Following washcoating, the monolith was dried, then calcined at 525° C. for 1 hour.

The catalyst described above was evaluated for its ability to decompose NO using NH3. The catalyst was evaluated at 605° C. at a space velocity of 20,000 $hr^{-1}$ employing a feed stream consisting of 10% $O_2$, 6.8% $H_2O$, 50 ppm NO, 70 ppm NH3, balance $N_2$. The table below reports the conversion of NO and the effluent concentration of NH3 as a function of time.

| Time-on-stream | NO Conversion | Effluent [NH3] |
|---|---|---|
| 5 hrs | 90.4% | 1.7 ppm |
| 25 hrs | 89.9% | 2.8 ppm |
| 50 hrs | 88.5% | 3.6 ppm |
| 100 hrs | 86.7% | 5.3 ppm |

These examples demonstrate that the invented catalyst offers improved stability over prior art in treating high temperature combustion gases. Unlike prior catalysts it can be used to reduce emissions of NOx to about 2-5 ppm during stable and long-term operations at over 550 C. Applications include, but are not limited to, treatment of stationary sources of combustion exhaust such as power plants, and mobile sources such as diesel exhaust.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process of selective catalytic reduction of NOx in a combustion exhaust stream comprising:
preparing a catalyst by the steps of
a) steam treating a zeolite material at about 500° C.-600° C. for about 5-15 hours;
b) adding iron to the zeolite material at a loading between 0.01% and 10% iron; and
c) calcining the zeolite material at about 750° C.-900° C. for about 1-5 hours;
wherein the order of steps a) and b) may vary, followed by step c);
mixing 60-82 ppm of ammonia into a combustion exhaust stream at over 500° C.;
contacting the combustion exhaust stream at 500° C.-650° C. with the catalyst in a manner necessary to facilitate a reaction between NO and $NO_2$ in the exhaust stream and the ammonia.

2. A process for preparing a catalyst for reduction of NOx in combustion exhaust, comprising:
a) steam treating a zeolite material at about 500° C.-600° C. for about 5-15 hours in air with about 10-25% water vapor;
b) adding iron to the zeolite material at a loading between 0.01% and 10% iron; and
c) calcining the zeolite material at about 500° C.-1100° C.;
wherein the order of steps a) and b) may vary, followed by step c).

3. The process of claim 2, wherein said calcining performed at 800° C.-900° C. for 1-5 hours.

4. The process of claim 2, comprising at least two calcining steps, at least one of which being performed in the range of 750° C.-900° C. for about 1-5 hours, and at least a final one of which being performed after the iron adding step.

5. The process of claim 2, further comprising adding tungsten and/or phosphorus to the zeolite material prior to the calcining step.

6. The process of claim 2, wherein the steam treating is performed at about with about 10-25% water vapor, and the calcining is performed at about 750° C.-900° C. in air with less than about 2% water vapor for about 1-5 hours.

7. The process of claim 2, further comprising:
mixing the catalyst prepared according to claim 1 with a liquid to form a slurry;
washcoating a catalytic converter bed form with the slurry; and
calcining the washcoated bed form to make a catalyst bed for a catalytic converter apparatus.

8. A process for preparing a catalyst for reduction of NOx in combustion exhaust, comprising:
a) adding iron to an alumino-silicate zeolite material;
b) steam treating the zeolite material at a temperature of 500° C.-600° C. for about 5-15 hours in air with about 10-25% water vapor such that said steam treating is sufficient for partial de-alumination of the zeolite material to approximately a steady state, but not sufficient to fully collapse the chemical structure of the zeolite material;
c) calcining the zeolite material at a temperature, humidity, and duration sufficient to stabilize the zeolite material; and
wherein the order of steps a) and b) may vary, followed by step c)
whereby the process creates a stable and efficient catalyst for converting NO to N2 and H20 in combustion exhaust at temperatures from 300° C. to over 700° C.

9. The process of claim 8 wherein said calcining is performed at 800° C.-900° C. for about 1-5 hours.

10. The process of claim 8, comprising:
steam treating a zeolite beta material at about 525° C. for about 5 hours;
calcining the zeolite beta material at about 825° C. for about 2 hours;
mixing the zeolite beta with iron (III) nonahydrate in water to form a slurry;
after about 1 hour, mixing zirconium acetate into the slurry;
washcoating a catalytic bed form with the slurry; and
calcining the washcoated catalytic bed form at about 525° C. for about 1 hour, forming a catalyst bed.

11. The process of claim 8, comprising:
steam treating a zeolite beta material at about 525° C. for about 5 hours;
mixing the zeolite beta material with iron (III) nonahydrate in water to form a first slurry;
heating the first slurry to about 90° C.;
after about 3 hours, calcining the first slurry at about 825° C. for about 2 hours to form an iron-containing zeolite material.

12. The process of claim 11, further comprising:
mixing the iron-containing zeolite material with zirconium acetate in water to form a second slurry;
washcoating a catalytic bed form with the second slurry; and calcining the washcoated catalytic bed form at about 525° C. for about 1 hour, forming a catalyst bed.

13. The process of claim 8, comprising:

mixing a zeolite beta material with lanthanum nitrate non-ahydrate in water to form a first slurry;

heating the first slurry to about 95° C. for about 6 hours;

mixing the resulting zeolite material with iron (III) non-ahydrate in water to form a second slurry;

heating the second slurry to about 90° C. for about 2 hours;

steam treating the resulting zeolite material at about 500° C. for about 14 hours;

calcining the resulting zeolite material at about 825° C. for about 2 hours to form a lanthanum zeolite beta material.

14. The process of claim 13, comprising:

mixing the lanthanum zeolite beta material and additional iron (III) nitrate nonahydrate with water to form a third slurry;

heating the third slurry to about 90° C.;

after about 3 hours, steam treating the resulting zeolite material at about 525° C. for about 5 hours; and calcining the resulting zeolite material at about 825° C. for about 2 hours to form an iron-lanthanum-containing zeolite material.

15. The process of claim 14, further comprising:

mixing the iron-lanthanum-containing zeolite material with zirconium acetate in water to form a fourth slurry;

washcoating a catalytic bed form with the fourth slurry; and calcining the washcoated catalytic bed form at about 525° C. for about 1 hour, forming a catalyst bed.

16. The process of claim 8, comprising:

steam treating a pre-calcined zeolite beta material at about 525° C. for about 5 hours;

mixing the resulting zeolite material with iron (III) non-ahydrate and ammonia metatungstate in water to form a first slurry;

heating the first slurry to about 90° C. for about 3 hours; and calcining the resulting zeolite material at about 825° C. for about 2 hours to form an iron-tungsten-containing zeolite material.

17. The process of claim 16, further comprising:

mixing the iron-tungsten-containing zeolite material with zirconium acetate in water to form a second slurry;

washcoating a catalytic bed form with the second slurry; and calcining the washcoated catalytic bed form at about 525° C. for about 1 hour, forming a catalyst bed.

18. The process of claim 8, comprising:

steam treating a zeolite beta material at about 525° C. for about 5 hours;

mixing the zeolite beta material with iron (III) nonahydrate and ammonium phosphate in water to form a first slurry;

heating the first slurry to about 90° C. for about 3 hours;

calcining the resulting zeolite material at about 825° C. for about 2 hours to form an iron-phosphorus-containing zeolite material.

19. The process of claim 18, further comprising:

mixing the iron-phosphorus-containing zeolite material with zirconium acetate in water to form a second slurry;

washcoating a catalytic bed form with the second slurry; and calcining the washcoated catalytic bed form at about 525° C. for about 1 hour, forming a catalyst bed.

\* \* \* \* \*